Feb. 23, 1954
E. E. LYNCH
2,669,786
ATTITUDE INDICATOR
Filed Sept. 17, 1946
3 Sheets-Sheet 1
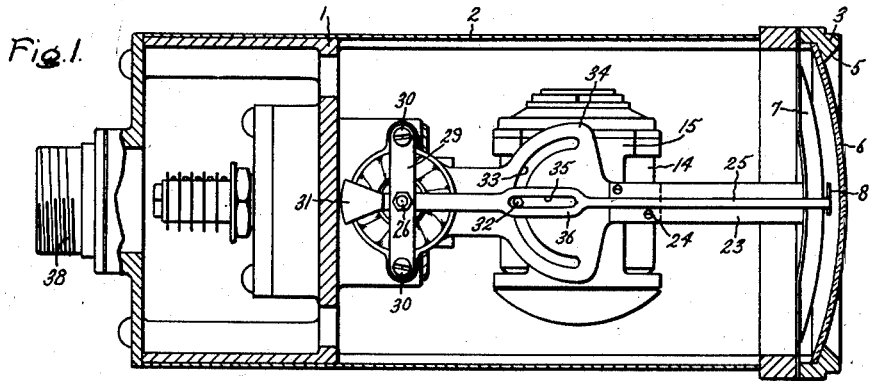
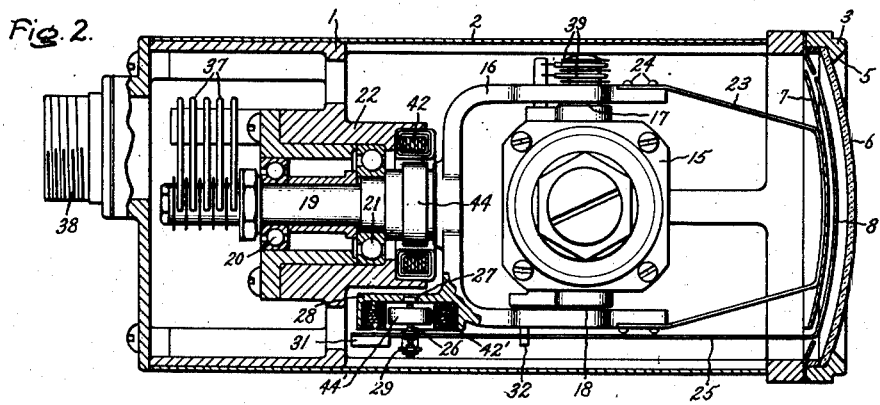
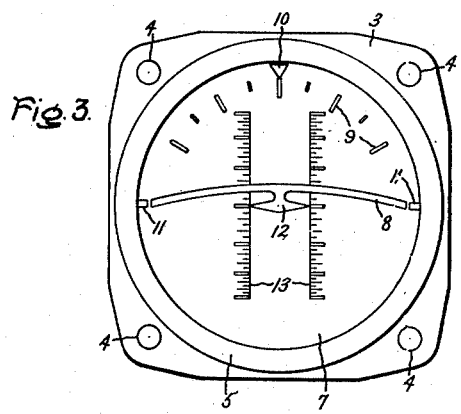
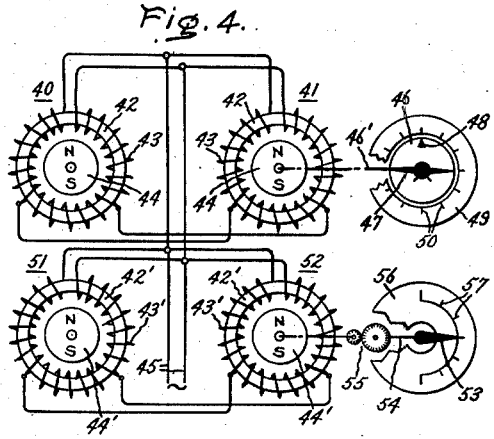
Inventor:
Edward E. Lynch,
by *Clarke N. Mott*
His Attorney.

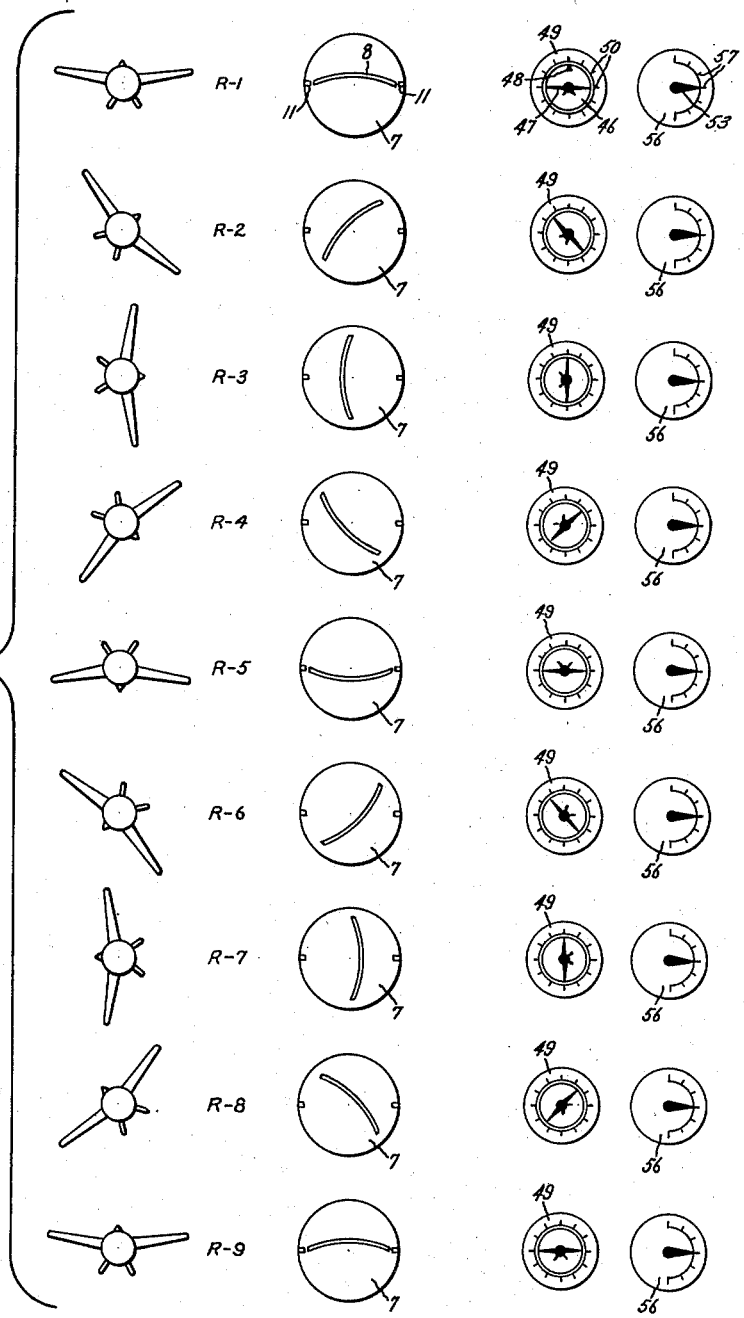

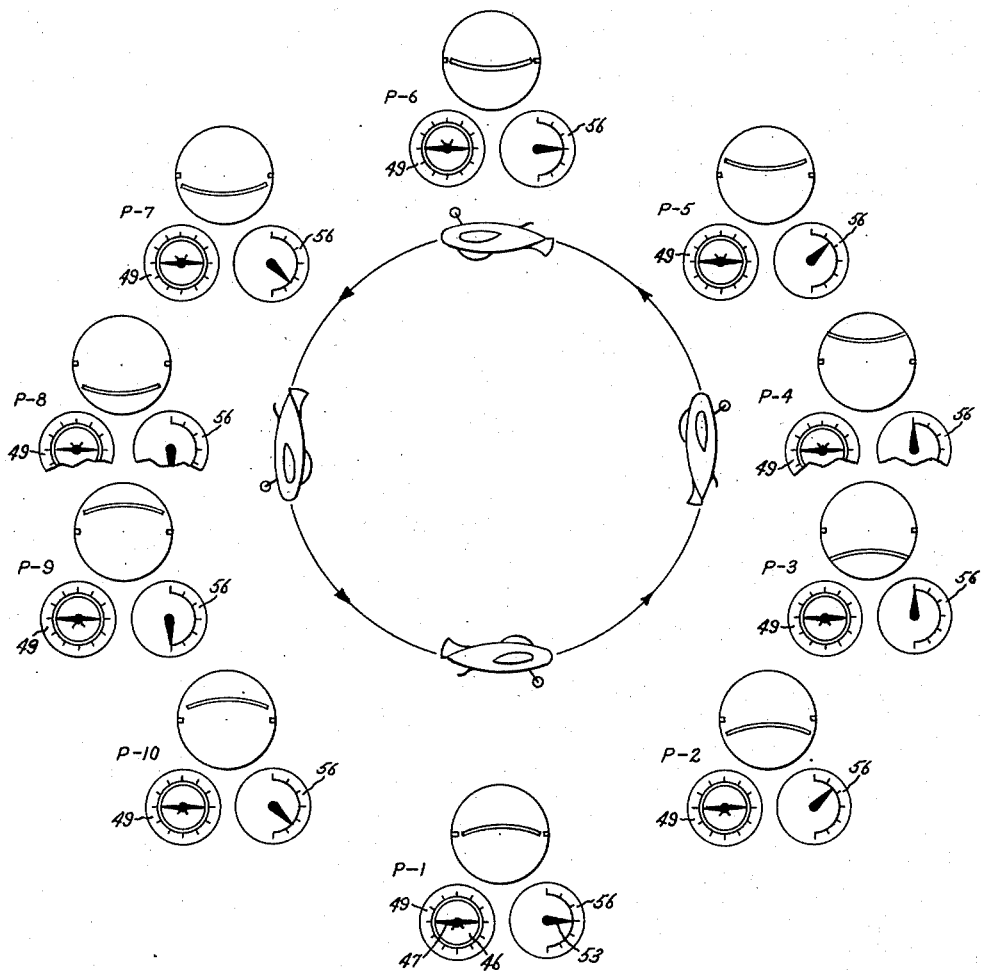

Patented Feb. 23, 1954

2,669,786

UNITED STATES PATENT OFFICE 2,669,786

ATTITUDE INDICATOR

Edward E. Lynch, Wakefield, Mass., assignor to General Electric Company, a corporation of New York Application September 17, 1946, Serial No. 697,456

1 Claim. (Cl. 33—204)

The present invention relates to attitude indicators and more particularly to attitude indicators of the gyroscopically actuated type known in the art as artificial horizons.

Artificial horizon gyroscope instruments are now widely used to indicate pitch and bank attitudes of an aircraft during blind flying operations. These instruments usually comprise a universally mounted gyroscope having a vertical spin axis, the gyroscope being used to actuate an indicator known as a skyplate for indicating the bank attitude of the aircraft. The gyroscope is also arranged to actuate a horizontal, vertically moving bar, known as a horizon bar, located in front of the skyplate in order to indicate the pitch attitude of the aircraft. These instruments are easy to read and interpret because the pilot or other observer can imagine that the horizon bar represents the natural horizon such as he would see if he were flying contact, i. e., observing the actual horizon. A difficulty encountered with the instruments of this type now in use is that the range of proper operation is limited to maneuvers of the aircraft which do not cause the mechanical limits of the gyroscope and attached mechanism to be exceeded. For example, operation of these instruments is usually limited to climbs and dives of the aircraft not exceeding 60 degrees from the horizontal, and banks in either direction not exceeding 90 degrees from the horizontal. If these limits are to be exceeded, it is necessary for the pilot to cage the gyroscope until the maneuver is completed and during this time, of course, he does not have advantage of the instrument for guiding and controlling his flight. Other gyroscopic attitude indicating instruments of the stabilized ball or sphere type have been developed which are universal in operation, i. e., they remain operative while the airplane flies through all attitudes. Some pilots feel, however, that these ball-type instruments are not as easy to read and interpret as the artificial horizon type of instrument since they lack an element, such as the horizon bar, which moves relative to the airplane in a manner similar to apparent movements of the actual horizon.

An object of the present invention is to provide a new and improved attitude indicator for aircraft.

Another object is to provide an artificial horizon type of attitude indicator which is universal in operation, i. e., it will indicate the attitude of the aircraft in bank and pitch for all attitudes into which the aircraft can be maneuvered.

Another object is to provide an attitude indicator which will give an attitude indication for all positions of the aircraft similar to what the pilot would see if he were observing the actual horizon.

Another object is to provide an attitude indicator which will give indication by means of which the pilot can easily determine whether he is flying in an upright or inverted position.

A further object of the invention is to provide a gyroscopically actuated device which will indicate at a position remote from the gyroscope the pitch and bank attitudes of an aircraft on which the device is mounted.

A still further object of the invention is to provide a universal attitude indicator which will provide electrical and mechanical attitude signals having no ambiguities, i. e., there is a different set of signals for each and every attitude into which the aircraft can be maneuvered.

Further objects and advantages of the invention will become apparent and the invention will be better understood from the following description, referring to the accompanying drawings and the features of novelty which characterize the invention will be pointed out with particularity in the claim annexed to and forming a part of this specification.

In the drawings

Fig. 1 is an elevational sectional view of a gyroscopically actuated artificial horizon instrument for aircraft embodying the universal operating and indicating features of the present invention.

Fig. 2 is a top sectional view of the instrument shown in Fig. 1.

Fig. 3 is a front view of the instrument shown in Fig. 1.

Fig. 4 is a schematic diagram including electrical connections showing how the instrument may be used to provide remote indication of pitch and bank attitudes of the aircraft.

Fig. 5 is a schematic presentation of the indications of the instrument during a roll maneuver of the aircraft, and Fig. 6 is another schematic presentation of the readings of the instrument during a looping maneuver of the aircraft.

Referring to the drawing, the invention is shown as embodied in an artificial horizon instrument suitable for mounting on the dash panel of an aircraft for indicating pitch and bank attitudes and movements to the pilot or other observer. The instrument is shown as comprising a skeleton frame 1 enclosed by a cylindrical casing 2 designed so that the instrument may be inserted into a circular opening in the dash panel. Mounted on the open front of the frame is a face plate 3 having openings 4 for receiving the mounting bolts of the instrument. The face plate 3 is provided with a circular opening 5 through which movements of the instrument are observed, the opening 5 being preferably covered by a suitable cover glass 6. Observed through the cover glass 6 are a rotatable skyplate 7 and a vertically moving horizon bar 8. The rotatable skyplate 7 is provided with suitable indicia 9 by means of which the angle of bank may be determined by reading these indicia against a stationary index 10 which may, for example, be inscribed upon the cover glass 6. As will be subsequently pointed out in detail the horizon bar 8 in addition to moving vertically relative to the skyplate 7 also rotates with the skyplate so that the banking attitude may also be determined by noting the position of the ends of the horizon bar relative to stationary indices 11. The pitch attitude of the aircraft is determined by noting the position of a pointer 12 depending from the horizon bar 8 relative to suitable indicia 13 inscribed or marked on the skyplate 7. For reasons which will become more apparent as the description proceeds the horizon bar 8 is constructed so that it curves downwardly in a manner suggestive of the curvature of the earth when in the position shown in Fig. 3 which it normally occupies during level flight in an upright position.

The skyplate 7 and the horizon bar 8 are actuated by means of a gyroscope comprising a rotor 14 mounted in a bearing frame 15 so that it is free to rotate about a spin axis which is normally vertical. The bearing frame 15 is mounted in a yoke-shaped gimbal 16 by means of trunnions 17 and 18 so that it is free to rotate about the trunnion axis. The axis defined by trunnions 17 and 18 may be termed the athwartship axis since with the instrument mounted on the dash panel in a normal manner this axis is traverse to the fore and aft axis of the aircraft. The gimbal member 16 is provided with a cylindrical extension 19 having an axis which is normal to the athwartship axis defined by the trunnions 17 and 18. The cylindrical gimbal extension 19 is carried by axially spaced ball bearings 20 and 21 which are supported within a hollow cylindrical extension 22 of the frame 1. With this construction the gimbal 16 is free to rotate 360 degrees about the axis of the cylindrical extension 19 which may be termed the fore and aft axis since with the usual instrument mounting arrangement this axis extends in a direction which is coincident with or parallel to the fore and aft axis of the aircraft.

Normally the gyroscope is provided with a pendulous erecting device for continuously precessing the gyroscope to a predetermined reference position relative to the direction of gravity. A showing of the erecting device, which may be of conventional construction, has been omitted in the interest of simplicity of illustration.

As clearly shown in Figs. 1 and 2 the skyplate 7 is supported on a U-shaped member 23 the ends of which are fastened to the ends of the yoke-shaped gimbal 16 by suitable fasteners such as screws 24. The inner surface of the curved skyplate 7 is secured to the base of the U-shaped member 23 in any suitable manner as by welding or cementing. With this arrangement it will be clear that any rotation of the frame or support 1 about the fore and aft axis of the gimbal 16 will cause a corresponding rotation of the index 10 relative to the skyplate 7. Since the universally mounted spinning gyroscope has the well known property of rigidity, the gimbal 16 and the attached skyplate 7 are stabilized thereby so that when the aircraft rolls about the fore and aft axis, the bank angle is indicated by the reading of the skyplate indicia 9 against the index 10.

The curved horizon bar 8 is supported by and forms a part of the outer end of a lever 25, the inner end of which is supported on the gimbal 16 so as to rotate about a pivot 26. As shown the inner end of the pivot 26 may be carried by a jewel 27 supported by a gimbal extension 28 while the other end of the pivot may be journalled in a support 29 which is mounted on the gimbal extension 28 by screws 30. With this arrangement the horizon bar 8 is free to pivot about an axis parallel to the athwartship axis to permit substantially vertical pitch indicating movement of the horizon bar 8 in front of the skyplate 7. In order to balance the lever 25 there is provided an extension projecting rearwardly from the pivot 26 which carries a counter weight 31. Preferably the gyroscope and its supporting gimbal are balanced so as to be in neutral equilibrium.

Because of the above-described arrangement of the fore and aft and athwartship axes of the gimbal member 16, it will be clear that any change in pitch attitude of the aircraft will be indicated by relative angular movement between the gimbal 16 and the bearing frame 15 about the athwartship gimbal axis. For the purpose of transmitting this angular movement to the lever 25 and the horizon bar 8 so that the horizon bar will indicate pitch attitude, there is provided a pin 32 which is rigidly secured to the bearing frame 15 and extends outwardly parallel to the athwartship gimbal axis. The pin 32 extends through and rides freely in an arcuate slot 33 provided in an enlarged vertically-extending web section 34 of one of the legs of the gimbal member 16. The pin 32 also extends through and rides in a longitudinally extending slot 35 provided in a centrally located enlarged section 36 of the lever 25. The edges of the slot 35 are accurately ground so as to permit the pin 32 to ride freely in the slot but at the same time prevent any lost motion or backlash between the pin 32 and the lever 25. Due to the fact that pin 32 is eccentrically located relative to the athwartship gimbal axis, any angular movement of the gimbal 16 about this axis causes a corresponding angular movement of the lever 25 about its pivot 26. This pivotal movement of the lever 25 in turn causes the horizon bar 8 to move vertically relative to the skyplate 7. Thus when the aircraft pivots about the athwartship gimbal axis into a climbing attitude the horizon bar 8 moves downwardly and vice versa as will be clear from the foregoing description.

Heretofore mechanical interference between the horizon bar and its surrounding structure or other mechanical interferences has prevented use of these instruments beyond predetermined limits of climb, dive and bank of the aircraft as heretofore pointed out. Furthermore, no practical way has been known for obtaining and presenting readable horizon bar indications during inverted flight. This difficulty is overcome in the present instrument by a novel constructional arrangement which will now be described.

Freedom from interference during steep banks including roll maneuvers to an inverted position is accomplished by the mechanical design which permits the gimbal 16 to rotate 360 degrees about the fore and aft gimbal axis. In this connection slip rings 37 are provided for conducting current from an electrical connector 38 to the rotating gimbal and the drive motor of the gyroscope (not shown).

Freedom from interference during climbs and dives to and beyond 90 degrees from the horizontal to inverted positions is the problem of greatest difficulty and is accomplished in the following manner. Readability for dives and for climbs up to 90 degrees is obtained by selecting the ratio of the distance from pin 32 to the pivot 26 to the distance from the pivot 26 to the horizon bar 8 such that for pitch changes up to 90 degrees the horizon bar remains within the field of view through the opening 5 with mechanical clearances for this movement which are not difficult to obtain. For pitch changes of 90 degrees from the horizontal and beyond, as encountered during looping maneuvers, interference is prevented by a gimbal stop arrangement which applies a momentary precessing torque to the gyroscope at approximately the 90 degree climb and dive position, resulting in a rapid 180 degree rotary movement of the gimbal 16 about the fore and aft gimbal axis. This gimbal rotation causes the horizon bar to transfer quickly from the bottom of the field of view to the top or vice versa, depending upon the direction of the loop, and during a continuation of the looping maneuver the horizon bar moves back across the face of the instrument giving the desired additional 180 degrees of freedom. It can be seen that this quick transfer of the horizon bar gives a very similar impression to that obtained during contact flying. When, for example, flying a loop starting in an easterly direction the plane is rising vertically, the eastern horizon disappears down from the pilot's view and almost immediately the western horizon appeared to him above.

Referring now specifically to the gimbal stop arrangement by which this is accomplished, the arcuate slot 33 is extended so that it permits free rotation of the gimbal 16 about the athwartship axis up to a point just short of the position, sometimes referred to as the gimbal lock position, where the fore and aft gimbal axis would become aligned with the spin axis of the gyroscope. This relative gyroscope and gimbal position occurs when the aircraft is in a substantially vertical climb or vertical dive position. The arcuate slot 33 is terminated so that at these positions the pin 32 engages the web 34 at the end of the slot and prevents further relative movement between the gimbal and the gyroscope bearing frame into the gimbal lock position. When the pin 32 engages the web 34 and the aircraft continues the looping maneuver, which would, in the absence of a stop, move the gimbal through the gimbal lock position, a torque is applied to the gyroscope resulting in a precessing movement which spins the gimbal and, as the loop continues the gimbal will rotate 180 degrees to the reverse position. Due to the reversal of the gimbal continued movement of the aircraft in the looping maneuver causes the pin 32 to back away from the web 34 and again ride freely in slot 33 so that the gyroscope is again completely free and behaves in a normal manner. If the looping maneuver is continued further the pin 32 rides around in the slot 33 until it engages the web 34 at the opposite end of the slot whereupon the gyroscope is again precessed resulting in a rotation of the gimbal back to its initial position, thus freeing the gyroscope to permit continued indication of the maneuver to the starting point.

The point at which the pin 32 engages the web 34 in either the vertical climb or vertical dive positions of the aircraft is preferably of the order of 2 degrees short of the gimbal lock position, i. e., the position in which the fore and aft gimbal axis would become aligned with the gyroscope spin axis. If this stop angle is made too small, that is, if it too closely approaches the gimbal lock position where the stop angle is zero, the component of gyroscope precessing torque about the fore and aft gimbal axis will not be sufficiently large to overcome the friction present in the gimbal bearing and the gimbal will not swing completely over. On the other hand, if the stop angle is made too large, for example, greater than 10 degrees, there will be a correspondingly large displacement of the gyroscope spin axis when the gimbal rotates 180 degrees giving an unacceptably larger error in attitude indication. With gyroscopic instruments having normal bearing friction it has been found that a stop angle of about 2 degrees gives the most satisfactory results, although some variations from this position is permissible depending on the bearing frictions and on the degree of accuracy desired. In the claims appended to this specification the stop means has been defined as engaging just short of the position to which the fore and aft gimbal axis would become aligned with the gyroscope spin axis. This definition is intended to include all stop arrangements causing the gimbal to rotate approximately 180 degrees in two positions of the aircraft on which the instrument is mounted which are approximately 180 degrees apart and is intended to exclude ordinary mechanical stops which in conventional instruments engage considerably ahead of the gimbal lock position and are not intended to and do not function in the manner described above.

The form of the stop between the gimbal and the gyroscope bearing frame is immaterial to the present invention and many other forms may be used. It is only necessary to provide some means for stopping relative rotation between gimbal and the gyroscope bearing frame just prior to the reaching of the gimbal lock position.

Due to the fact that the stop limits rotation of the gyroscope bearing frame about the athwartship gimbal axis to something less than 180 degrees, it is unnecessary to provide slip rings for carrying current from the rotating gimbal 16 to the gyroscope motor in the bearing frame. Because of the limited rotation of the gyroscope bearing frame the current may be conducted from the gimbal to the bearing frame by means of conductor spirals which are indicated at 39. In the interest of simplicity a showing of the current conductors leading from the receptacle 38 to the gyroscope drive motor has been omitted, although the necessary slip rings and spirals are indicated.

It is sometimes desirable to provide remote indication of pitch and bank attitudes of an aircraft either with or without the direct indication provided by the moving horizon bar and skyplate in the construction heretofore described. Through the action of the gimbal stop which causes the gyroscope gimbal to rotate 180 degrees when the aircraft passes through the vertical climb and dive positions, it is possible to provide a unique form of easily interpreted remote indication which will now be described.

As pointed out above, the pitch of the aircraft is indicated by the angular position of the gimbal 16 relative to the gyro bearing frame 15 about the athwartship gimbal axis and the bank attitude of the aircraft is indicated by the relative angular position of the gimbal 16 relative to the support 1 about the fore and aft gimbal axis. In order to provide remote indication of pitch and bank attitude, angular position transmitting apparatus of the self-synchronous type is provided for reproducing these angular pitch and bank indicating movements at a distance. While any suitable type of angular motion transmitting apparatus may be used, there is illustrated in Fig. 4 of the drawing electrical angular motion transmitting apparatus of the so-called second harmonic type. The bank transmitter and receiver units, indicated generally at 40 and 41, are similar in construction, each comprising an annular stator core 42 of magnetically saturable material carrying a distributed exciting winding 43. The exciting winding 43 is tapped at equal intervals to provide polyphase connections, the corresponding polyphase connections of the transmitter and receiver units being interconnected as shown. The transmitter and receiver units also have poled permanent magnet rotors 44 which rotate relative to the annular stator in coaxial relation therewith. When the exciting windings 43 are energized from a suitable source of periodically varying current 45, the rotor of the receiver unit 41 remains in angular correspondence with the rotor of the transmitter 40 as will be well understood by those skilled in the art. The permanent magnet rotor of the bank transmitter may be conveniently carried on the cylindrical extension 19 of the gimbal 16 while the bank transmitter stator 42 may be coaxially arranged therewith and carried in the hollow extension 22 of the instrument frame 1. The bank receiver 41 may be located at any suitable position and in order to provide an easily read indication of the bank attitude there is shown a bank indicator 46 mechanically coupled to rotate with the receiver rotor 44 by a shaft 46'. The indicator may be, as shown, in the form of a circular disk carrying thereon a miniature airplane 47 and an index 48. The angular positions of the bank indicator 46 are read relative to a stationary index plate 49 carrying thereon suitable indicia 50.

In order to provide remote pitch attitude indication there are provided a pitch transmitter and receiver units indicated generally at 51 and 52. Electrical parts of the pitch transmitter and receiver units are identical with the previously described bank transmitter and receiver units and corresponding parts have been given the same reference numerals except that the numbers have been primed. In the interest of saving space the pitch transmitter unit is arranged to transmit the angular motion of the lever 25 relative to the gimbal 16 rather than the angular motion of the gyroscope bearing frame 15 relative to the gimbal 16. This is possible because there is a fixed relationship between these two angular movements as pointed out above.

In order to transmit the angular motion of the horizon bar lever 25 the pitch transmitter rotor 44' is mounted on the pivot shaft 26 so as to rotate with the lever. The pitch transmitter stator member 42' is arranged coaxially with the rotor member and is carried in a hollow portion of the gimbal extension 28. The pitch receiver unit 52 is preferably located adjacent the bank receiver unit and for the purpose of indicating pitch attitude in a convenient manner there is provided a pitch indicator in the form of a pointer 53 which is mechanically coupled to the pitch receiver rotor 44' by a shaft 54. In order that the maximum angular movement of the pointer 53 may be 90 degrees there is preferably interposed in the mechanical connection between the pointer 53 and the pitch receiver rotor mechanical speed-up gearing indicated schematically at 55. This is necessitated because of the fact that the angular movement of the horizon bar lever 25 relative to the gimbal 16 is somewhat less than the angular movement of the gyro bearing frame 15 relative to the gimbal for reasons which have been pointed out heretofore. The pitch pointer 53 is read against the stationary index plate 56 having marked thereon suitable indicia 57.

For ease in reading and interpreting the indicators are arranged so that the miniature airplane 47 and the pointer 53 are horizontal when the aircraft is in a horizontal position with respect to both pitch and bank attitudes.

The operation of my improved attitude indicating instrument with respect to both direct and remote pitch and bank indications will more easily be understood by reference to Figs. 5 and 6 of the drawing which show the instrument indications as they appear to the pilot or to an observer when the aircraft is caused to execute roll and loop maneuvers.

Referring first to Fig. 5 of the drawings, there are reproduced instrument indications corresponding to nine positions numbered R1 to R9, inclusive, of the aircraft on which the instrument is mounted. The position of the aircraft as viewed from the rear is indicated on the left side of the drawings. At R1 corresponding to the level position, the horizon bar 8 is generally horizontal, the slight downward curvature simulating the curvature of the earth and indicating to the pilot that he is in an upright position. As the plane banks to the right the horizon bar 8 appears to the pilot to bank to the left in the same manner as the apparent movement of the actual horizon, the 45, 90 and 135 degree bank positions being indicated at R2, R3 and R4. After the 90 degree bank position has been passed the curvature of the horizon bar is reversed, that is, it curves upwardly indicating that the flight has become inverted. When the level inverted flight position is reached as indicated at R5 the horizon bar is again horizontal but curves upwardly. After the 90 degree bank position is passed at position R7, the curvature of the horizon bar once more is downward indicating upright flight and finally when level upright flight is again attained, position R9, the horizon bar is once again level corresponding to position R1. The curvature of the horizon bar resolves an ambiguity which would otherwise be present if the horizon bar were straight and provides an easily interpreted indication which enables the pilot to tell whether he is flying in an upright or inverted position.

During the roll maneuver the miniature airplane 47 on the bank receiver indicator 45 executes a roll maneuver corresponding to the aircraft and provides a convenient means for determining remotely the bank attitude of the aircraft. During the roll maneuver previously described it has been assumed that the aircraft remains level about the athwartship axis, i. e., there is no pitch change. For this condition the pitch indicator 53 remains horizontal because there is no relative movement between the gimbal 16 and the bearing frame 15 and consequently no movement of the pitch transmitter 51.

Fig. 6 of the drawing shows the instrument indication during an inside loop, the wings remaining horizontal during this maneuver. The various positions of the aircraft are numbered P1 to P10, inclusive, following the diagram around in a counter-clockwise direction. The position P1 corresponds to level upright flight, and the horizon bar 8, the miniature airplane 47 and the pointer 53 are horizontal as shown. Upright flight is indicated by the downward curvature of the horizon bar and also by the upright attitude of the miniature airplane 47. The indication at P2 corresponds to a 45 degree climb, the horizon bar having moved downwardly and the pitch pointer having moved up to the 45 degree climb position. Since the wings remain level the miniature airplane 47 also remains level in all positions of this maneuver.

P3 shows the instrument indication just prior to the time the stop pin 32 engages the web 34 at the lower end of the arcuate slot 33 which corresponds to substantially a vertical climb of the aircraft. The horizon bar now occupies its lowermost upright position and the pitch pointer 53 points straight up indicating the vertical climb condition. As the aircraft passes through the vertical climb position the pin 32 engages web 34 at the bottom of slot 33 causing the gimbal 16 to rotate 180 degrees. As indicated at P4 the horizon bar now occupies the top portion of the instrument face and curves upwardly indicating inverted flight. Inverted flight is also indicated by rotation of miniature airplane 180 degrees to the inverted position. Since rotation of the gimbal 16 does not produce any rotation of the pitch transmitter 51, the pointer 53 continues to point straight up indicating vertical climb.

As the aircraft continues around the loop the inverted horizon bar now begins to move downwardly from the top of the instrument and the pointer 53 moves back towards the level flight position, as indicated at P5.

The inverted position of the aircraft at the top of the loop is indicated at P6 where it will be noted that the horizon bar is again level although curved upwardly indicating the inverted flight, which is also indicated by the inverted miniature airplane 47. The pitch pointer 53 is again horizontal indicating level flight.

A continuation around the loop is indicated at P7. The horizon bar and the pitch pointer having moved downwardly indicating that the aircraft has begun to dive.

P8 shows the instrument indication just prior to the engagement of the pin 32 at the upper end of the arcuate slot 33 which corresponds to substantially a vertical dive of the aircraft. The horizon bar now occupies its lowermost position while inverted and the pitch pointer 53 points straight down indicating the vertical dive condition.

As the aircraft passes through the vertical dive position the pin 32 engages the web 34 at the top of the slot 33 causing the gimbal 16 to again rotate 180 degrees back to its original position. As indicated at P9 the horizon bar now occupies the top portion of the instrument face and once more curves downwardly indicating upright flight. This condition is also indicated by rotation of the miniature airplane 180 degrees to its upright position. Since rotation of the gimbal 16 does not produce any rotation of the remote pitch transmitter 51, the pointer 53 remains pointed downwardly.

The instrument indications as the airplane begins to level off towards the bottom of the loop are shown at P10, where it will be noted that the horizon bar has now moved downwardly and the pitch pointer has begun to move up toward the level flight position.

When the aircraft returns to its initial position at the bottom of the loop, the instrument indications are the same as indicated at P1 showing that level upright flight has again been attained.

A careful consideration of the indications both at the instrument and remote therefrom for the various conditions of flight illustrated in Figs. 5 and 6 will show that I have provided a universally operating attitude indicating instrument which enables the pilot or other observer to tell at a glance the pitch and bank attitude of an aircraft in space during all possible maneuvers under blind flying conditions. The use of a gimbal stop which engages at positions corresponding to approximately vertical climb and dive positions of the aircraft not only solves the perplexing mechanical interference problem in an artificial horizon instrument but also permits the presentation of easily interpreted indications by means of which the pilot can distinguish upright from inverted flight. Furthermore, the gimbal stop arrangement prevents any ambiguity in the mechanical indication of the horizon bar or the electrical signals of the remote pitch and bank transmitters which would otherwise occur if the gyroscope bearing frame were free to rotate 360 degrees in its supporting gimbal. In other words, there is a distinct set of mechanical and electrical signals for each and every attitude into which the aircraft can be maneuvered.

For some military applications 90 degree dives of the aircraft are frequently made and in such cases it may be undesirable to have the rotation of the horizon bar occur at this point. This difficulty can be overcome in a simple manner by initially inclining the frame of the instrument upwardly a small amount, say 10 degrees, at the normal level flight position. Rotation of the gimbal will then occur at a dive of 100 degrees and a climb of 80 degrees. The horizon bar can be adjusted 10 degrees to compensate for this change.

While I have illustrated a horizon bar curved to simulate the curvature of the earth the same effect can, of course, be obtained by providing a horizon indicator of any configuration which allows differentiating between its upright or upside down position such as one on which a curved horizon line has been marked, painted or otherwise indicated without departing from the spirit of my invention.

In this patent I do not claim broadly the use of a gimbal stop to prevent gimbal lock in a universally operating gyroscopic instrument as this is the subject matter of a prior invention of Allen T. Sinks, which is disclosed and broadly claimed in a copending application, Serial No. 594,628, filed May 19, 1945, assigned to the same assignee as the present invention. The invention of this patent is an application of the gimbal stop principle to solve an interference problem heretofore present in artificial horizon instruments and to obtain a novel form of indication of the pitch and bank attitudes of an aircraft in flight.

Modifications of the particular arrangements which I have disclosed embodying my invention will occur to those skilled in the art, so that I do not desire my invention to be limited to the particular arrangements set forth and I intend in the appended claim to cover all modifications which do not depart from the spirit and scope of my invention.

What I claim as new and desire to secure by Letters Patent of the United States is:

An artificial horizon indicator for an aircraft comprising a gyroscope mounted to rotate in a bearing frame so that the spin axis is approximately vertical, a gimbal supporting said bearing frame for rotation about an athwartship axis, a support adapted to be mounted on said aircraft on which said gimbal is mounted for rotation about a fore and aft axis, a skyplate secured to said gimbal and rotatable therewith to give a bank indication relative to said support, a horizon bar pivoted on said gimbal so as to move in front of said skyplate, said horizon bar being curved to simulate the curvature of the earth as viewed from in front of said skyplate, means for moving said horizon bar before said skyplate in response to relative movement between said bearing frame and said gimbal about said athwartship axis to give a pitch indicating movement, and stop means for preventing relative movement between said bearing frame and said gimbal about said athwartship axis beyond an angle between 2 and 10 degrees short of the position where said fore and aft gimbal axis would become aligned with the gyro spin axis as in vertical climb and dive positions of said aircraft, said stop means when engaged causing said gyroscope to precess resulting in rotation of said gimbal and said skyplate and the pivoted horizon bar approximately 180 degrees about the fore and aft gimbal axis whenever said aircraft passes through vertical climb and dive positions whereby an observer can easily determine whether the aircraft is upright or inverted by noting the direction of curvature of the horizon bar relative to said support.

EDWARD E. LYNCH.

References Cited in the file of this patent

UNITED STATES PATENTS

| Number | Name | Date |
|---|---|---|
| 2,080,490 | Kollsman | May 18, 1937 |
| 2,128,956 | Moss | Sept. 6, 1938 |
| 2,160,970 | Koster | June 6, 1939 |
| 2,207,414 | Rodanet | July 9, 1940 |
| 2,333,983 | Carlson | Nov. 9, 1943 |
| 2,392,494 | Murtagh et al. | Jan. 8, 1946 |
| 2,467,254 | Carlson | Apr. 12, 1949 |

FOREIGN PATENTS

| Number | Country | Date |
|---|---|---|
| 140,482 | Great Britain | Apr. 1, 1920 |